(12) United States Patent
Yamazaki et al.

(10) Patent No.: US 12,144,366 B2
(45) Date of Patent: Nov. 19, 2024

(54) BREADCRUMB MIX

(71) Applicant: NISSHIN SEIFUN WELNA INC., Tokyo (JP)

(72) Inventors: Shuhei Yamazaki, Chuo-ku (JP); Michihiro Sakakibara, Chuo-ku (JP); Souichiro Hiwatashi, Chuo-ku (JP)

(73) Assignee: NISSHIN SEIFUN WELNA INC., Tokyo (JP)

( * ) Notice: Subject to any disclaimer, the term of this patent is extended or adjusted under 35 U.S.C. 154(b) by 967 days.

(21) Appl. No.: 17/264,566

(22) PCT Filed: Aug. 2, 2019

(86) PCT No.: PCT/JP2019/030390
§ 371 (c)(1),
(2) Date: Jan. 29, 2021

(87) PCT Pub. No.: WO2020/027306
PCT Pub. Date: Feb. 6, 2020

(65) Prior Publication Data
US 2021/0329952 A1 Oct. 28, 2021

(30) Foreign Application Priority Data
Aug. 2, 2018 (JP) .................. 2018-146079

(51) Int. Cl.
*A23L 7/157* (2016.01)
*A23L 13/00* (2016.01)
*A23L 29/212* (2016.01)

(52) U.S. Cl.
CPC .............. *A23L 7/157* (2016.08); *A23L 13/03* (2016.08); *A23L 29/212* (2016.08)

(58) Field of Classification Search
None
See application file for complete search history.

(56) References Cited

U.S. PATENT DOCUMENTS

| | | | |
|---|---|---|---|
| 4,218,485 A | 8/1980 | Lee et al. | |
| 4,885,180 A | 12/1989 | Cochran et al. | |
| 2010/0062116 A1* | 3/2010 | Noort | A23L 5/15 426/573 |

FOREIGN PATENT DOCUMENTS

| | | |
|---|---|---|
| CN | 1102763 A | 5/1995 |
| CN | 101692842 A | 4/2010 |
| CN | 101744022 A | 6/2010 |
| JP | 55-150870 A | 11/1980 |
| JP | 64-71433 A | 3/1989 |
| JP | 8-228706 A | 9/1996 |
| JP | 3035287 B2 | 2/2000 |
| JP | 2010-154852 A | 7/2010 |
| JP | 2011-103837 A | 6/2011 |
| JP | 2011-103838 A | 6/2011 |
| JP | 2012-39913 A | 3/2012 |
| JP | 2012-161274 A | 8/2012 |
| JP | 5417281 B2 | 2/2014 |
| JP | 2014-128243 A | 7/2014 |
| JP | 2015-2722 A | 1/2015 |
| JP | 2015-146770 A | 8/2015 |
| WO | WO 2015/162972 A1 | 10/2015 |

OTHER PUBLICATIONS

Combined Chinese Office Action and Search Report issued Feb. 11, 2023 in Chinese Patent Application No. 201980051480.5 (with unedited computer-generated English Translation), 22 pages.
Extended European Search Report issued Mar. 3, 2022 in corresponding European Patent Application No. 19843921.8, 7 pages.
International Search Report issued on Sep. 10, 2019 in PCT/JP2019/030390 filed on Aug. 2, 2019, 2 pages.
Singaporean Office Action issued Jul. 4, 2022 in Singaporean Patent Application No. 11202100361Y, 12 pages.

* cited by examiner

*Primary Examiner* — Jyoti Chawla
(74) *Attorney, Agent, or Firm* — Oblon, McClelland, Maier & Neustadt, L.L.P.

(57) ABSTRACT

Provided is a breadcrumb mix that enables production of cooked breaded food having good appearance and texture. A breadcrumb modifier contains a pregelatinized hydroxypropylated starch and/or a pregelatinized acetylated starch. The breadcrumb mix contains the breadcrumb modifier.

16 Claims, No Drawings

BREADCRUMB MIX

TECHNICAL FIELD

The present invention relates to a breadcrumb mix and a breadcrumb modifier used to produce the breadcrumb mix.

BACKGROUND ART

Fried breaded food is typically produced as follows: raw meat, such as pork, beef, or chicken, raw seafood, such as horse mackerel or salmon, or vegetables, or other food materials are first dredged in flour (sprinkled with flour) and dipped in egg wash or batter, and breadcrumbs are attached to food materials, followed by deep-frying in oil. However, a series of these steps is very complicated, and there is an increasing demand to produce fried breaded food in easier and simpler steps.

There have been proposed breadcrumb mixes that can be directly attached to food materials before deep-frying in oil to produce fried breaded foods. Patent Literature 1 discloses a batter mix for breaded fries. The batter mix contains breadcrumbs and at least one selected from a paste adhesive, pregelatinized starch, dried egg white, and dried whole egg. Patent Literature 2 discloses a breadcrumb mix that contains dry breadcrumbs and pregelatinized starch and/or protein powder, and a polysaccharide thickener. Patent Literature 3 discloses processed breadcrumbs produced by spraying, onto the surfaces of dry breadcrumbs, a solution containing a protein and at least one high viscous material selected from the group consisting of saccharides and protein hydrolysates, and drying the obtained breadcrumbs. Patent Literature 4 discloses processed breadcrumbs including breadcrumbs and starch powder and/or protein powder attaching to the breadcrumbs. The processed breadcrumbs are produced by mixing fresh breadcrumbs and starch powder and/or protein powder and drying the obtained mixture. Patent Literature 5 discloses a breadcrumb-containing mix for fried calamari-like food. The mix contains wheat gluten, starch, and soy sauce powder.

CITATION LIST

Patent Literature

Patent Literature 1: JP 55-150870 A
Patent Literature 2: JP 5417281 B1
Patent Literature 3: JP 8-228706 A
Patent Literature 4: JP 3035287 B1
Patent Literature 5: JP 2015-146770 A

SUMMARY OF INVENTION

Technical Problem

The existing breadcrumb mixes described above have issues of component separation during storage or poor attachment property to food materials. The fried food obtained by using the existing breadcrumb mixes does not always have satisfactory appearance and texture. There is a demand for a breadcrumb mix that enables production of high-quality cooked breaded food having good appearance and texture.

Solution to Problem

The inventors of the present invention found that a breadcrumb mix containing a pregelatinized hydroxypropylated starch and/or a pregelatinized acetylated starch shows good attachment property to food materials, and that high-quality cooked breaded food having good appearance and texture is obtained when the breadcrumb mix is directly attached to food materials, such as meat and seafood, before cooking.

The present invention thus provides the following embodiments.

[1] A breadcrumb modifier containing a pregelatinized hydroxypropylated starch and/or a pregelatinized acetylated starch.

[2] The breadcrumb modifier described in [1], further containing at least one selected from the group consisting of protein materials and thickeners.

[3] The breadcrumb modifier described in [2], containing 20% by mass or more of the pregelatinized hydroxypropylated starch and/or the pregelatinized acetylated starch and 5 to 80% by mass in total of at least one selected from the group consisting of the protein materials and the thickeners.

[4] The breadcrumb modifier described in any one of [1] to [3], wherein the breadcrumb modifier is in powder form.

[5] A breadcrumb mix containing breadcrumbs and the breadcrumb modifier described in any one of [1] to [4].

[6] The breadcrumb mix described in [5], containing 3 to 70 parts by mass of the breadcrumb modifier relative to 100 parts by mass of the breadcrumbs.

[7] The breadcrumb mix described in [5] or [6], containing 50 to 95% by mass of the breadcrumbs.

[8] The breadcrumb mix described in any one of [5] to [7], wherein the breadcrumb modifier attaches to surfaces of the breadcrumbs.

[9] A cooked breaded food including the breadcrumb mix described in any one of [5] to [8] attaching thereto.

[10] A method for producing a breadcrumb mix including attaching a pregelatinized hydroxypropylated starch and/or a pregelatinized acetylated starch to surfaces of breadcrumbs.

[11] The method described in [10], including attaching, to the surfaces of the breadcrumbs, a composition containing the pregelatinized hydroxypropylated starch and/or the pregelatinized acetylated starch and at least one selected from the group consisting of protein materials and thickeners.

[12] The method described in [11], wherein the composition contains 20% by mass or more of the pregelatinized hydroxypropylated starch and/or the pregelatinized acetylated starch and 5 to 80% by mass in total of at least one selected from the group consisting of the protein materials and the thickeners.

[13] The method described in any one of [10] to [12], wherein the pregelatinized hydroxypropylated starch and/or the pregelatinized acetylated starch or the composition is in powder form.

[14] The method described in any one of [10] to [13], wherein 3 to 70 parts by mass of the pregelatinized hydroxypropylated starch and/or the pregelatinized acetylated starch or the composition is attached to 100 parts by mass of the breadcrumbs.

[15] A method for producing a cooked breaded food including: attaching the breadcrumb mix described in any one of [5] to [8] directly to a surface of a food material; and baking or deep-frying with oil, the food material having the breadcrumb mix attaching thereto.

Advantageous Effects of Invention

A breadcrumb mix produced by using a breadcrumb modifier according to the present invention shows good attachment property to food materials. By simply attaching the breadcrumb mix directly to food materials, an adequate amount of coating can be formed on the surfaces of the food materials. High-quality cooked breaded food having good appearance and texture can be produced by cooking food materials having the breadcrumb mix attaching thereto. The cooked breaded food shows uniform and favorable color after being fried, is voluminous with good "Kendachi" (Japanese term meaning that breadcrumbs stand upright like swords), and further has crispy coating, and maintains the tastes of food materials. In addition, the breadcrumb mix can be used in various types of cooking, such as deep-frying in a large amount of oil and baking with a small amount of oil.

DESCRIPTION OF EMBODIMENTS

The present invention provides a breadcrumb modifier used to produce a breadcrumb mix, and a breadcrumb mix produced by using the breadcrumb modifier. The breadcrumb modifier according to the present invention contains a pregelatinized hydroxypropylated starch and/or a pregelatinized acetylated starch. The breadcrumb mix according to the present invention is obtained by mixing the breadcrumb modifier and breadcrumbs. The obtained breadcrumb mix is used as a coating material in production of cooked breaded food.

As used herein, the "modification" of breadcrumbs refers to improved properties of breadcrumbs used as a coating material, for example, improved attachment property to food materials and/or improved appearance and texture of coating of cooked breaded food obtained by cooking food materials having breadcrumbs attaching thereto.

The pregelatinized hydroxypropylated starch contained in the breadcrumb modifier according to the present invention is a processed starch formed by subjecting starch to hydroxypropylation and pregelatinization. The pregelatinized acetylated starch contained in the breadcrumb modifier according to the present invention is a processed starch formed by subjecting starch to acetylation and pregelatinization. Hydroxypropylation can be typically carried out by causing starch to react with propylene oxide under alkaline conditions. Acetylation can be typically carried out by causing starch to react with, for example, acetic anhydride or vinyl acetate so that an acetyl group is added to the starch. The degree of substitution in the obtained hydroxypropylated starch and the obtained acetylated starch is not limited, but normally 0.01 to 0.2, and preferably about 0.03 to 0.2. Pregelatinization can be carried out by pregelatinizing (gelatinizing) starch, preferably hydroxypropylated or acetylated starch, by a normal method, drying the pregelatinized starch, and pulverizing the dried starch as desired. Pregelatinization can be carried out by, for example, moist heating with saturated steam, spray drying, or drum drying, or by using an extruder. Examples of starches used as a raw material of the pregelatinized hydroxypropylated starch and the pregelatinized acetylated starch include, but are not limited to, potato starch, sweet potato starch, wheat starch, corn starch, waxy corn starch, tapioca starch, sago starch, and rice starch. The pregelatinized hydroxypropylated starch and the pregelatinized acetylated starch used in the present invention may be processed in combination with other processing. Examples of other processing include esterification, cross-linking, acid treatment, oxidation, moist heating, and a combination of these treatments.

The amount of the pregelatinized hydroxypropylated starch and/or the pregelatinized acetylated starch in the breadcrumb modifier according to the present invention, in terms of the total amount of the pregelatinized hydroxypropylated starch and the pregelatinized acetylated starch, is preferably 20% by mass or more, more preferably 30% by mass or more, still more preferably 40% by mass or more, yet still more preferably 50% by mass or more, yet still more preferably 70% by mass or more, and yet still more preferably 80% by mass or more in the entire amount of the modifier. If the total amount of the pregelatinized hydroxypropylated starch and the pregelatinized acetylated starch in the breadcrumb modifier according to the present invention is too low, the breadcrumbs may not be modified sufficiently.

Preferably, the breadcrumb modifier according to the present invention further contains at least one selected from the group consisting of protein materials and thickeners and more preferably further contains a protein material and a thickener. The presence of a protein material or thickener further improves the breadcrumb modification effect of the breadcrumb modifier. Examples of the protein material include wheat proteins, such as gluten, gliadin, and glutenin; egg proteins, such as whole egg, egg white, and egg yolk; milk proteins, such as skimmed milk powder and whey protein; soy protein, and gelatin. Among these protein materials, wheat proteins, egg proteins, and gelatin are preferred, and gluten and dried egg white are more preferred. These protein materials can be used alone or in combination of two or more. Examples of the thickener include pullulan, glucomannan, agar, curdlan, sodium alginate, carrageenan, gellan gum, xanthan gum, pectin, and gelatin. Among these thickeners, pullulan, glucomannan, curdlan are preferred. These thickeners can be used alone or in combination of two or more.

The amount of each of the protein material and the thickener in the breadcrumb modifier according to the present invention is 80% by mass or less, preferably 70% by mass or less, more preferably 50% by mass or less, still more preferably 5 to 80% by mass, yet still more preferably 5 to 70% by mass, yet still more preferably 5 to 50% by mass, and yet still more preferably 5 to 30% by mass in the entire amount of the modifier. More preferably, the total amount of the protein material and the thickener is 80% by mass or less, preferably 70% by mass or less, more preferably 50% by mass or less, still more preferably 5 to 80% by mass, yet still more preferably 5 to 70% by mass, yet still more preferably 5 to 50% by mass, and yet still more preferably 5 to 30% by mass in the entire amount of the modifier.

The average particle size of each of the pregelatinized hydroxypropylated starch, the pregelatinized acetylated starch, the protein material, and the thickener contained in the breadcrumb modifier according to the present invention is about 20 to 500 μm, and preferably 30 to 300 μm. If the average particle size is out of the above range, the breadcrumb modifier may easily be separated from breadcrumbs. As used herein, the average particle size refers to the mean volume diameter (MV) in the laser diffraction and scattering method.

The breadcrumb modifier according to the present invention may further contain, as desired, other raw materials, such as cereal flours, starches other than the pregelatinized hydroxypropylated starch and the pregelatinized acetylated starch, seasonings, oils or fats, emulsifiers, sweeteners, acidulants, common salt, spices, coloring agents, enzymes, and flavors unless the appearance and texture of a cooked breaded food obtained by using a breadcrumb mix containing the breadcrumb modifier are impaired. The amount of these other raw materials in the breadcrumb modifier according to the present invention is 50% by mass or less, and preferably 1 to 20% by mass in the entire amount of the modifier.

The breadcrumb modifier according to the present invention can be prepared from the pregelatinized hydroxypropylated starch and/or the pregelatinized acetylated starch described above, or can be prepared by mixing the pregelatinized hydroxypropylated starch and/or the pregelatinized acetylated starch with at least one selected from the protein materials, the thickeners, and other raw materials described above as desired. Preferably, the breadcrumb modifier is in powder form. Examples of the method for preparing the breadcrumb modifier in powder form include mixing, for example, the pregelatinized hydroxypropylated starch and/or the pregelatinized acetylated starch, the protein material, and the thickener each having the average particle size described above and being in powder form.

The breadcrumb modifier according to the present invention is used to produce a breadcrumb mix. The breadcrumb mix according to the present invention thus contains breadcrumbs and the breadcrumb modifier according to the present invention. The breadcrumb mix according to the present invention can be produced by mixing breadcrumbs and the breadcrumb modifier according to the present invention. The mixing causes the breadcrumb modifier according to the present invention to attach to the surfaces of the breadcrumbs. Therefore, the breadcrumb mix according to the present invention may be processed breadcrumbs in which the breadcrumb modifier according to the present invention attaches to the surfaces of breadcrumbs.

Preferably, the production of the breadcrumb mix according to the present invention involves preparing the breadcrumb modifier according to the present invention beforehand from the pregelatinized hydroxypropylated starch and/or the pregelatinized acetylated starch described above and, as desired, the protein material, the thickener, and other raw materials described above, and next mixing the prepared breadcrumb modifier with breadcrumbs. Preferably, the beforehand prepared breadcrumb modifier according to the present invention is in powder form. Preferably, the beforehand prepared breadcrumb modifier according to the present invention is a uniform mixture prepared by mixing the pregelatinized hydroxypropylated starch and/or the pregelatinized acetylated starch and at least one selected from the protein materials and the thickeners such that these components are uniformly distributed in the mixture.

The breadcrumbs used to produce the breadcrumb mix according to the present invention may be selected from various types of breadcrumbs for ordinary use. The breadcrumbs are produced by using commonly used breadcrumb raw materials, such as flour, yeast, sugar, common salt, and oil or fat, in accordance with a typical production method, such as a baking method and an electrode method. The materials and the production method are, however, not limited. The breadcrumbs used to produce the breadcrumb mix according to the present invention may be dry breadcrumbs or fresh breadcrumbs, but preferably dry breadcrumbs. The amount of the breadcrumbs (in terms of dry breadcrumbs) in the breadcrumb mix according to the present invention is preferably 50 to 95% by mass, and preferably 60 to 90% by mass.

The amount of the breadcrumb modifier according to the present invention in the breadcrumb mix according to the present invention is 3 to 70 parts by mass, preferably 5 to 55 parts by mass, and more preferably 11 to 33 parts by mass relative to 100 parts by mass of the breadcrumbs (in terms of dry breadcrumbs, the same applies hereinafter). If the amount of the breadcrumb modifier is too low or too high, the appearance and texture of a cooked breaded food obtained by using the obtained breadcrumb mix may not be improved sufficiently.

The amount of the pregelatinized hydroxypropylated starch and/or the pregelatinized acetylated starch in the entire amount of the breadcrumb mix according to the present invention, in terms of the total amount of the pregelatinized hydroxypropylated starch and the pregelatinized acetylated starch, may be preferably 0.3% by mass or more, more preferably 0.5% by mass or more, still more preferably 1.1% by mass or more, yet still more preferably 0.3 to 41.2% by mass, yet still more preferably 0.5 to 35% by mass, yet still more preferably 1.1 to 24.8% by mass, yet still more preferably 0.3 to 20.6% by mass, yet still more preferably 0.5 to 17.7% by mass, and yet still more preferably 1.1 to 12.4% by mass. If the total amount of the pregelatinized hydroxypropylated starch and the pregelatinized acetylated starch in the breadcrumb mix is less than 0.3% by mass or more than 41.2% by mass, the appearance and texture of a cooked breaded food obtained by using the breadcrumb mix may not be improved sufficiently.

The amount of each of the protein material and the thickener in the entire amount of the breadcrumb mix according to the present invention may be preferably 0.075 to 32.9% by mass, more preferably 0.125 to 28.4% by mass, still more preferably 0.15 to 17% by mass, yet still more preferably 0.25 to 15% by mass, yet still more preferably 0.28 to 19.8% by mass, and yet still more preferably 0.36 to 10.6% by mass. The total amount of the protein material and the thickener in the entire amount of the breadcrumb mix according to the present invention may be preferably 0.075 to 32.9% by mass, more preferably 0.125 to 28.4% by mass, still more preferably 0.15 to 17% by mass, yet still more preferably 0.25 to 15% by mass, yet still more preferably 0.28 to 19.8% by mass, and yet still more preferably 0.36 to 10.6% by mass.

The breadcrumb mix according to the present invention may further contain, as desired, other raw materials, such as cereal flours, starches other than the pregelatinized hydroxypropylated starch and the pregelatinized acetylated starch, seasonings, emulsifiers, sweeteners, acidulants, common salt, spices, coloring agents, enzymes, and flavors unless the appearance and texture of a cooked breaded food obtained by using the breadcrumb mix according to the present invention are impaired. The other raw materials may be contained in the breadcrumb modifier according to the present invention beforehand as described above, or may be added separately when breadcrumbs are mixed with the breadcrumb modifier according to the present invention. From the viewpoint of uniformity of the breadcrumb mix and ease in producing the breadcrumb mix, the other raw materials are preferably contained in the breadcrumb modifier according to the present invention beforehand. The amount of the other raw materials in the breadcrumb mix according to the present invention is 20 parts by mass or less and preferably 12.5 parts by mass or less relative to 100 parts by mass of the breadcrumbs.

In the production of the breadcrumb mix according to the present invention, a mixture obtained after mixing the breadcrumbs and the breadcrumb modifier may be dried or sized as desired. When the breadcrumbs being a raw material of the breadcrumb mix are fresh breadcrumbs, the obtained mixture is preferably dried. The moisture content of the breadcrumb mix according to the present invention is 2 to 20% by mass. From the viewpoint of preservation and texture, the moisture content is preferably 3 to 15% by mass. The size of the breadcrumb mix according to the present invention is not limited, but the average particle size of the breadcrumb mix is preferably 100 µm to 7 mm, and more preferably 200 µm to 5 mm. The procedure for measuring the average particle size is defined as described above.

The breadcrumb mix according to the present invention can be used to produce a cooked breaded food. Thus, the present invention also provides a cooked breaded food having the breadcrumb mix according to the present invention attaching thereto. The cooked breaded food may be fried food or non-fried food.

The breadcrumb mix according to the present invention can be used in various types of cooking, such as baking with a small amount of oil and deep-frying in a large amount of oil. For baking with a small amount of oil, what is called a non-fried breaded food can be produced as follows: the breadcrumb mix according to the present invention is directly attached to the surface of a food material, such as meat or seafood, and the food material is then baked with a small amount of oil, for example, on a thin layer of oil by using a cooking equipment, such as a pot, a frying pan, a griddle, or an oven. The amount of oil required for baking is 50 mL or less, and preferably 30 mL or less relative to 100 g of a food material, such as meat or seafood, in order to reduce the intake of oil. For deep-frying in a large amount of oil, a fried breaded food can be produced as follows: the breadcrumb mix according to the present invention is attached to the surface of a food material, such as meat or seafood, and then the food material is placed in an oil-filled frying pot to fry the food material by an ordinary method. The oil used in the baking and deep-frying is any normal edible oil. Examples of the oil include vegetable oils and fats, such as rapeseed oil, refined soybean oil, rice oil, sesame oil; and animal oils and fats, such as lard.

The breadcrumb mix according to the present invention shows good attachment property to food materials and enables cooking of food materials with an adequate amount of breadcrumbs attaching thereto both in baking with a small amount of oil and in deep-frying in a large amount of oil. Therefore, the breadcrumb mix according to the present invention provides high-quality cooked breaded food having good appearance and texture. The cooked breaded food shows uniform and favorable color after being fried, is voluminous with good "Kendachi", and further has crispy coating, and maintains the tastes of food materials.

The present invention will be described below in more detail by way of Examples; however, the present invention is not limited to the following Examples.

EXAMPLES

Reference Example (1) Production of Pregelatinized Hydroxypropylated Starch

Tapioca starch (100 parts by mass) was mixed with 120 parts by mass of water containing 20 parts by mass of sodium sulfate dissolved therein, and the resulting mixture was stirred to form a dispersion. To the obtained dispersion, propylene oxide was added with stirring while the pH was maintained at around 11 by using 1N NaOH solution. The reaction liquid was allowed to react for a day and night while being maintained at 41° C. The reaction liquid was neutralized with sulfuric acid and then washed with water. The obtained dispersion was pregelatinized and spray-dried with a spay dryer, and the resulting powder was sifted through a sieve to provide a pregelatinized hydroxypropylated tapioca starch having an average particle size (value measured with Microtrac MT3000II available from Nikkiso Co., Ltd., the same applies hereinafter) of 300 µm.

(2) Production of Hydroxypropylated Starch

A hydroxypropylated tapioca starch having an average particle size of 300 µm was produced in the same manner as in (1) except that the dispersion was dried with reduced pressure and pulverized, instead of being pregelatinized and spray-dried with a spay dryer, before being sifted through a sieve similarly.

(3) Production of Acetylated Starch

To 100 parts by mass of tapioca starch, 120 parts of water was added to form a slurry. The slurry was adjusted to pH 9 by addition of 3% sodium hydroxide. To the resulting slurry, acetic anhydride was added over 180 minutes while the pH was maintained at pH 8 to 9 by addition of 3% sodium hydroxide, whereby the acetylation reaction was carried out. Next, the acetylation reaction was terminated by adjusting the pH to pH 5 through addition of 9% hydrochloric acid. After the reaction was terminated, 2 L of water was added, followed by dehydration and subsequent drying. The resulting power was sifted through a sieve similarly to provide an acetylated tapioca starch having an average particle size of 300 µm.

(4) Production of Pregelatinized Acetylated Starch

The acetylated tapioca starch produced in (3) was pregelatinized and spray-dried with a spay dryer, and the resulting powder was sifted through a sieve similarly to provide a pregelatinized acetylated tapioca starch having an average particle size of 300 µm.

(5) Production of Pregelatinized Starch

Tapioca starch (100 parts by mass) was suspended in 120 parts by mass of water, and pregelatinized and spray-dried with a spay dryer. The resulting powder was sifted through a sieve similarly to provide a pregelatinized tapioca starch having an average particle size of 300 µm.

Test Example 1

(1) Production of Breadcrumb Mix

The pregelatinized hydroxypropylated tapioca starch, the pregelatinized acetylated tapioca starch, the hydroxypropylated tapioca starch, the acetylated tapioca starch, the pregelatinized tapioca starch each produced in Reference Example, or unprocessed tapioca starch (each having an average particle size of 300 µm) was mixed with breadcrumbs ("dry breadcrumbs" available from FRYSTAR) at the amounts described in Table 1 until the mixture was uniform, whereby a breadcrumb mix was produced.

(2) Production of Tonkatsu (Japanese Pork Cutlet)

The breadcrumb mix was spread on a tray, and pork loin (about 1 cm thick, about 100 g×1 chop) was placed on the breadcrumb mix. The meat was turned over several times so that the breadcrumb mix was attached to the entire surface of the meat. The meat was then deep-fried in oil for about 3 minutes in an oil pan heated to 170° C. to produce Tonkatsu. The appearance and texture of the obtained Tonkatsu were evaluated by 10 trained panelists on the basis of the following evaluation criteria, and the average scores were calculated. The results are shown in Table 1.

<Evaluation Criteria>

(Appearance)

5: very good; breadcrumbs are uniformly attached to the entire surface of the meat, good Kendachi, even color after being fried.

4: good; breadcrumbs are attached to the entire surface of the meat, good Kendachi, almost even color after being fried.

3: slightly good; there are some areas on the meat surface to which breadcrumbs thinly attach, almost even color after being fried.

2: poor; there are some areas on the meat surface to which breadcrumbs thinly attach, slightly uneven color after being fried.

1: very poor; there are some areas on the meat surface to which breadcrumbs thinly attach or in which breadcrumbs fall off, uneven color after being fried.

(Texture)

5: very good; very crispy coating in harmony with the taste of the meat

4: good; crispy coating in harmony with the taste of the meat

3: slightly poor; relatively less crispy coating, slightly hard meat

2: poor; less crispy coating, hard meat

1: very poor; non-crispy coating, dry and hard meat

TABLE 1

|  | Production Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Breadcrumb mix composition (parts by mass) breadcrumbs | 100 | 100 | 100 | 100 | 100 | 100 | 100 | 100 | 100 | 100 | 100 | 100 | 100 |
| pregelatinized hydroxypropylated tapioca starch | 3 | 5 | 11 | 33 |  | 16.5 | 55 | 68 |  |  |  |  |  |
| pregelatinized acetylated tapioca starch |  |  |  |  | 33 | 16.5 |  |  |  |  |  |  |  |
| hydroxypropylated tapioca starch |  |  |  |  |  |  |  |  | 33 |  |  | 16.5 |  |
| acetylated tapioca starch |  |  |  |  |  |  |  |  |  | 33 |  |  |  |
| pregelatinized tapioca starch |  |  |  |  |  |  |  |  |  |  | 33 | 16.5 |  |
| unprocessed tapioca starch |  |  |  |  |  |  |  |  |  |  |  |  | 33 |
| Total amount (% by mass) of pregelatinized hydroxypropylated tapioca starch and pregelatinized acetylated tapioca starch in breadcrumb mix | 2.9 | 4.8 | 9.9 | 24.8 | 24.8 | 24.8 | 35.5 | 40.5 | — | — | — | — | — |
| Appearance | 3.7 | 4.1 | 4.2 | 4.5 | 4.3 | 4.3 | 4.1 | 3.6 | 2.9 | 2.8 | 2.2 | 2.6 | 2.0 |
| Texture | 3.5 | 4.0 | 4.1 | 4.4 | 4.2 | 4.3 | 4.0 | 3.6 | 3.1 | 3.0 | 2.3 | 2.7 | 2.5 |

Test Example 2

Starch mixtures shown in Tables 2 to 3 were prepared, and the starch mixtures each were mixed with breadcrumbs in accordance with the same procedure as in Test Example 1 to produce breadcrumb mixes having the compositions shown in Table 2. Tonkatsu was produced by using the obtained breadcrumb mixes in accordance with the same procedure as in Test Example 1, and evaluated. The results are shown in Tables 2 to 3.

TABLE 2

|  | Production Example | | | | | | | | | |
| --- | --- | --- | --- | --- | --- | --- | --- | --- | --- | --- |
|  | 9 | 10 | 11 | 12 | 13 | 14 | 15 | 16 | 17 | 18 |
| Starch mixture (% by mass) pregelatinized hydroxypropylated tapioca starch | 95 | 80 | 70 | 50 | 30 | 20 |  |  |  |  |
| pregelatinized acetylated tapioca starch |  |  |  |  |  |  | 70 | 50 | 30 | 20 |

TABLE 2-continued

| | Production Example | | | | | | | | | |
|---|---|---|---|---|---|---|---|---|---|---|
| | 9 | 10 | 11 | 12 | 13 | 14 | 15 | 16 | 17 | 18 |
| egg white powder | 5 | 20 | 30 | 50 | 70 | 80 | | | | |
| gluten | | | | | | | 30 | 50 | 70 | 80 |
| pullulan | | | | | | | | | | |
| Total Breadcrumb mix composition (parts by mass) | 100 | 100 | 100 | 100 | 100 | 100 | 100 | 100 | 100 | 100 |
| breadcrumbs | 100 | 100 | 100 | 100 | 100 | 100 | 100 | 100 | 100 | 100 |
| starch mixture | 11 | 11 | 11 | 11 | 11 | 11 | 11 | 11 | 11 | 11 |
| Total amount (% by mass) of pregelatinized hydroxypropylated tapioca starch and pregelatinized acetylated tapioca starch in breadcrumb mix | 9.4 | 7.9 | 6.9 | 5.0 | 3.0 | 2.0 | 6.9 | 5.0 | 3.0 | 2.0 |
| Appearance | 4.3 | 4.4 | 4.6 | 4.4 | 4.2 | 4.0 | 4.5 | 4.3 | 4.1 | 3.9 |
| Texture | 4.2 | 4.4 | 4.4 | 4.3 | 4.2 | 4.0 | 4.3 | 4.2 | 4.0 | 3.8 |

TABLE 3

| | Production Example | | | | | |
|---|---|---|---|---|---|---|
| | 19 | 20 | 21 | 22 | 23 | 24 |
| Starch mixture (% by mass) pregelatinized hydroxypropylated tapioca starch pregelatinized acetylated tapioca starch | 80 | 80 | 80 | 80 | 95 | 70 |
| egg white powder | | | 10 | | | |
| gluten | 20 | | | 10 | | |
| pullulan | | 20 | 10 | 10 | 5 | 30 |
| Total Breadcrumb mix composition (parts by mass) | 100 | 100 | 100 | 100 | 100 | 100 |
| breadcrumbs | 100 | 100 | 100 | 100 | 100 | |
| starch mixture | 11 | 11 | 11 | 11 | 11 | |
| Total amount (% by mass) of pregelatinized hydroxypropylated tapioca starch and pregelatinized acetylated tapioca starch in breadcrumb mix | 7.9 | 7.9 | 7.9 | 7.9 | 9.4 | 6.9 |
| Appearance | 4.4 | 4.6 | 4.7 | 4.6 | 4.4 | 4.4 |
| Texture | 4.5 | 4.4 | 4.6 | 4.6 | 4.3 | 4.4 |

The invention claimed is:

1. A breadcrumb mix comprising:
   50 to 95% by mass of breadcrumbs; and
   3 to 70 parts by mass of a breadcrumb modifier attached to surfaces of the breadcrumbs, relative to 100 parts by mass of the breadcrumbs,
   wherein the breadcrumb modifier comprises 20% by mass or more of a pregelatinized hydroxypropylated starch and/or a pregelatinized acetylated starch, and 5 to 80% by mass in total of at least one selected from the group consisting of a protein material and a thickener.

2. A method for producing a cooked breaded food, the method comprising:
   attaching the breadcrumb mix of claim 1 directly to a surface of a food material; and
   baking or deep-frying, with oil, the food material having the breadcrumb mix attaching thereto.

3. A method for producing a breadcrumb mix, the method comprising attaching a pregelatinized hydroxypropylated starch and/or a pregelatinized acetylated starch to surfaces of breadcrumbs.

4. The method of claim 3, wherein the attaching involves attaching a composition comprising the pregelatinized hydroxypropylated starch and/or the pregelatinized acetylated starch to the surfaces of the breadcrumbs, and the composition further comprises at least one selected from the group consisting of a protein material and a thickener.

5. The method of claim 4, wherein the composition comprises 20% by mass or more of the pregelatinized hydroxypropylated starch and/or the pregelatinized acetylated starch, and
   5 to 80% by mass in total of at least one selected from the group consisting of the protein material and the thickener.

6. The method of claim 4, wherein the composition is in powder form.

7. The method of claim 4, wherein 3 to 70 parts by mass of the composition is attached to 100 parts by mass of the breadcrumbs.

8. The method of claim 3, wherein the pregelatinized hydroxypropylated starch and/or the pregelatinized acetylated starch is in powder form.

9. The method of claim 3, wherein 3 to 70 parts by mass of the pregelatinized hydroxypropylated starch and/or the pregelatinized acetylated starch is attached to 100 parts by mass of the breadcrumbs.

10. A method for modifying breadcrumbs, comprising attaching a pregelatinized hydroxypropylated starch and/or a pregelatinized acetylated starch to surfaces of the breadcrumbs.

11. The method of claim 10, wherein the attaching involves attaching a composition comprising the pregelatinized hydroxypropylated starch and/or the pregelatiacetylated starch to the surfaces of the breadcrumbs, and the composition further comprises at least one selected from the group consisting of a protein material and a thickener.

12. The method of claim 11, wherein the composition comprises 20% by mass or more of the pregelatinized hydroxypropylated starch and/or the pregelatinized acetylated starch, and 5 to 80% by mass in total of at least one selected from the group consisting of the protein material and the thickener.

13. The method of claim 11, wherein the composition is in powder form.

14. The method of claim 11, wherein 3 to 70 parts by mass of the composition is attached to 100 parts by mass of the breadcrumbs.

15. The method of claim 10, wherein the pregelatinized hydroxypropylated starch and/or the pregelatinized acetylated starch is in powder form.

16. The method of claim 10, wherein 3 to 70 parts by mass of the pregelatinized hydroxypropylated starch and/or the pregelatinized acetylated starch is attached to 100 parts by mass of the breadcrumbs.

\* \* \* \* \*